(12) United States Patent
Khotimsky et al.

(10) Patent No.: US 9,853,764 B2
(45) Date of Patent: Dec. 26, 2017

(54) OPTICAL NETWORK UNIT SELF-CALIBRATION IN MULTI-WAVELENGTH PASSIVE OPTICAL NETWORK

(71) Applicants: ZTE Corporation, Shenzhen (CN); ZTE (USA) Inc., Austin, TX (US)

(72) Inventors: Denis Andreyevich Khotimsky, Westborough, MA (US); DeZhi Zhang, Shanghai (CN); ChangLei Li, Shanghai (CN)

(73) Assignees: ZTE Corporation, Shenzhen (CN); ZTE (USA) Inc., Richardson, TX (US)

( * ) Notice: Subject to any disclaimer, the term of this patent is extended or adjusted under 35 U.S.C. 154(b) by 9 days.

(21) Appl. No.: 14/891,628

(22) PCT Filed: Mar. 24, 2014

(86) PCT No.: PCT/CN2014/073975
§ 371 (c)(1),
(2) Date: Nov. 16, 2015

(87) PCT Pub. No.: WO2014/183505
PCT Pub. Date: Nov. 20, 2014

(65) Prior Publication Data
US 2016/0080105 A1    Mar. 17, 2016

(30) Foreign Application Priority Data

May 15, 2013   (WO) ................ PCT/CN2013/075658

(51) Int. Cl.
*H04B 10/07* (2013.01)
*H04B 10/27* (2013.01)
(Continued)

(52) U.S. Cl.
CPC .... *H04J 14/0257* (2013.01); *H04B 10/07957* (2013.01); *H04B 10/272* (2013.01); *H04J 14/0232* (2013.01); *H04J 14/0282* (2013.01)

(58) Field of Classification Search
CPC ............... H04J 14/0232; H04J 14/0257; H04J 14/0282; H04J 14/02; H04B 10/272; H04B 10/07957; H04B 10/079
(Continued)

(56) References Cited

U.S. PATENT DOCUMENTS

| 7,522,845 B2 * | 4/2009 | Lautenschlager ..... H01S 5/0687 398/159 |
| 2008/0089699 A1 * | 4/2008 | Li ....................... H04J 14/0221 398/197 |

(Continued)

FOREIGN PATENT DOCUMENTS

| WO | 2012/107321 A1 | 8/2012 |
| WO | 2014/131352 A1 | 9/2014 |

OTHER PUBLICATIONS

European Search Report dated Jan. 4, 2017 for European Patent Application No. 14798001.5, filed on Mar. 24, 2014 (8 pages).
(Continued)

*Primary Examiner* — Ken N Vanderpuye
*Assistant Examiner* — Dibson Sanchez
(74) *Attorney, Agent, or Firm* — Perkins Coie LLP (57) ABSTRACT

A method and an apparatus for self-calibration of an ONU receiver in a multi-wavelength PON system, said method including the initial physical layer scan of the receiver tuning range, distributed estimation of the down-stream wavelength channel drift with respect to the nominal standard-based wavelengths, and reporting the estimated downstream wavelength channel drift in the downstream Channel_Map message.

19 Claims, 9 Drawing Sheets

(51) Int. Cl.
*H04J 14/00* (2006.01)
*H04J 14/02* (2006.01)
*H04B 10/079* (2013.01)
*H04B 10/272* (2013.01)

(58) Field of Classification Search
USPC .............................. 398/25–38, 58–64, 66–73
See application file for complete search history.

(56) References Cited

U.S. PATENT DOCUMENTS

| | | | |
|---|---|---|---|
| 2008/0166127 A1* | 7/2008 | Kazawa | H04J 14/025 398/79 |
| 2008/0267627 A1 | 10/2008 | Effenberger | |
| 2009/0028553 A1* | 1/2009 | Oron | H04Q 11/0067 398/25 |
| 2009/0110400 A1* | 4/2009 | Nozue | H04J 14/0282 398/71 |
| 2009/0136230 A1 | 5/2009 | Bouda | |
| 2009/0202245 A1 | 8/2009 | Bouda | |
| 2009/0269053 A1* | 10/2009 | Yang | H04B 10/0791 398/22 |
| 2011/0236017 A1* | 9/2011 | Ohlen | H04J 14/0282 398/34 |
| 2012/0008958 A1* | 1/2012 | Dahlfort | H04J 14/0282 398/85 |
| 2012/0183297 A1* | 7/2012 | Rohde | H04B 10/0731 398/90 |
| 2013/0034356 A1* | 2/2013 | Luo | H04B 10/272 398/72 |
| 2013/0089322 A1* | 4/2013 | Ohlen | H04B 10/07957 398/25 |
| 2013/0094862 A1* | 4/2013 | Luo | H04J 14/0278 398/68 |
| 2013/0209105 A1* | 8/2013 | Jeong | H04J 14/0282 398/72 |
| 2013/0308937 A1* | 11/2013 | Pohlmann | H01S 5/0014 398/27 |
| 2014/0099105 A1* | 4/2014 | Yan | H04B 10/0799 398/38 |
| 2014/0233944 A1* | 8/2014 | Vetter | H04J 14/0282 398/34 |
| 2015/0016822 A1* | 1/2015 | Ishikawa | H04J 14/0257 398/79 |
| 2015/0023664 A1* | 1/2015 | Mukai | H04J 14/0242 398/58 |
| 2015/0030322 A1* | 1/2015 | Froc | H04B 10/0795 398/25 |
| 2015/0037027 A1* | 2/2015 | Froc | H04B 10/0795 398/25 |
| 2015/0055957 A1* | 2/2015 | Lee | H04J 14/0227 398/79 |
| 2015/0098704 A1* | 4/2015 | Gao | H04J 14/0246 398/68 |
| 2015/0125149 A1* | 5/2015 | Gao | H04J 14/0246 398/58 |
| 2016/0226618 A1* | 8/2016 | Lee | H04J 14/0282 |

OTHER PUBLICATIONS

International Search Report and Written Opinion dated Jun. 10, 2014 for International Application No. PCT/CN2014/073975, filed on Mar. 24, 2014 (9 pages).

* cited by examiner

OPTICAL NETWORK UNIT SELF-CALIBRATION IN MULTI-WAVELENGTH PASSIVE OPTICAL NETWORK

BACKGROUND

This document relates to passive optical networks and, in some aspects, to optical network units (ONU).

SUMMARY

In one exemplary aspect, methods, apparatus and computer program products are disclosed related to the subject matter of operating an optical network unit (ONU) in an optical communication network, comprising performing a physical layer scan over a tuning range, setting up operation of the ONU on a channel based on the physical layer scan, monitoring a controllable tuning parameter during the operation to a configured threshold, and reporting, when the controllable tuning parameter exceeds the configured threshold, a value of the controllable tuning parameter to an optical line termination (OLT).

In another exemplary aspect, apparatus, method and computer program product are disclosed related to transmitting an optical carrier in a downstream direction towards one or more optical network units (ONUs), the optical carrier being transmitted at a first wavelength, receiving a drift report from an ONU, the drift report indicating that, as measured by the ONU, the transmission was received at a second wavelength value that was different from the first wavelength value, determining, based on the received drift report, whether a wavelength drift has occurred in the transmission of the optical carrier and broadcasting, when it is determined that the wavelength drift has occurred, channel tracking information indicative of the wavelength drift.

In yet another exemplary aspect, a disclosed multi-wavelength passive optical network (MW-PON) system comprises:

(a) an optical distribution network (ODN) comprising trunk fiber, one or more branching element, and a plurality of distribution fibers of the ODN, (b) a plurality of optical line terminations (OLTs) attached via a wavelength multiplexor (WM) to the trunk fiber of the ODN, each said OLT being associated with an individual bi-directional wavelength channel comprising a single downstream and single upstream wavelengths, and supporting a specific downstream line rate and one or more distinct upstream line rates; and (c) a plurality of optical network units (ONUs), each said ONU being attached to a respective distribution fiber, being tunable over a specific range of downstream wavelengths and a specific range of upstream wavelengths, and supporting a specific downstream line rate and a specific upstream line rate, where in ONU executes a self-calibration procedure, and the OLT facilitates the execution of this procedure by estimating the downstream channel transmission wavelength drifts and ensuring that the downstream channel transmission wavelength drift information for all active downstream channels in the MW-PON system is broadcast downstream on all channels in MW-PON system.

DETAILED DESCRIPTION

A passive optical network (PON) is an optical network architecture based on point-to-multipoint (P2MP) topology in which a single optical fiber and multiple passive branching points are used to provide data communication services. A PON system can facilitate user access with a service provider communication facility to access telecommunication, information, entertainment, and other resources of the Internet. A PON system can include a central node, called an optical line terminal (OLT), which can be in connection with a single or multiple user nodes called optical network units (ONUS) via a passive optical distribution network (ODN). An ONU can be located at or near the access user's premises. An OLT can be located at the access provider's communication facility (central office). In a conventional PON based on time-division multiplexing/time-division multiple access (TDM/TDMA) principles, such as G.984 G-PON or G.987 XG-PON, the OLT operates on a single downstream wavelength and a single upstream wavelength. The plurality of the ONUS connected to the OLT over the ODN share the same downstream and same upstream wavelength.

When an ONU joins or resumes operations on a conventional TDM PON system, it has to undergo activation, that is, a set of distributed procedures executed by the OLT and the ONU and comprising the phases of parameter learning, serial number acquisition (discovery), and ranging. In a TDM-PON system, an ONU receiver is fixed; that is, always tuned into a correct downstream wavelength by virtue of manufacturing and testing process. When the activation procedure is started, the ONU attempts to synchronize to the downstream signal searching for the regularly repeated standard pattern known as PSync and, once successful, acquires the downstream signal by receiving and processing the downstream frames. The ONU uses the general information regularly transmitted in the downstream direction to learn the operational parameters of the network. These events constitute the content of the parameter learning phase, which is further described in detail below. Once the parameter learning phase is sufficiently complete, the ONU looks for the special downstream transmission known as a Serial Number grant to announce its presence on the PON system, by announcing its unique Serial Number in the upstream transmission burst. Subsequently, the OLT assigns the ONU a local identifier known as ONU-ID, which allows the ONU to be addressed directly, and completes the activation by ranging the ONU, that is, establishing its specific equalization delay. Once activated, the ONU continues to monitor the general information transmitted downstream and implements any changes in the operational parameters of the network In a multi-wavelength passive optical network (MW-PON), multiple OLTs each operating on a unique downstream wavelength channel and unique upstream wavelength channel are connected to one and the same ODN via a wavelength multiplexer (WM), and over the said ODN are connected to a plurality of ONUS. An upstream wavelength channel may be composed of multiple periodic wavelengths. A combination of one downstream wavelength channel and one upstream wavelength channel associated with a given OLT forms a bi-directional wavelength channel. Multiple downstream wavelengths reach each ONU. However, each ONU is typically capable of receiving and processing only one downstream wavelength at any given time and to generate only one upstream wavelength at any given time. An ONU may be designed to operate on a specific pair of downstream and upstream wavelengths, in which case it is a fixed ONU, or it may be capable of changing its downstream and upstream wavelength in time, in which case it is tunable ONU. A tunable ONU may be able to tune its receiver and its transmitter independently. An ONU with a tunable receiver sets the internal controlled receiver parameter, such as current, voltage, power, or temperature to a particular value to tune the receiver to particular wavelength. An ONU with a tunable transmitter sets the internal controlled transmitter parameter, such as current, voltage, power, or temperature to a particular value to tune the transmitter to particular wavelength. Since the set of allowed bi-directional wavelength channels is finite, and the nominal operational wavelengths corresponding to each bi-directional wavelength channel can be specified in advance in a standard or operational document, the actual downstream or upstream wavelength value can be without loss of generality substituted, respectively, by a downstream or upstream channel index (channel ID).

Calibration is a process of establishing a correspondence between the value of the internal controlled parameter and the attainable wavelength in the downstream and upstream directions, respectively. Calibration can be achieved at a factory or in a laboratory prior to installation into the network, in which case it is referred to as pre-calibration. Calibration may be performed in the course of operation in a deployment, in which case it is known as in-service calibration. Since pre-calibration impacts the cost of a device, with higher accuracy of pre-calibration being associated with the higher cost, it is desirable for a network operator to procure an ONU with the weakest calibration properties that satisfy the operational requirements and constraints of the network.

If an ONU with a receiver having strong calibration properties is installed in a TWDM-PON-based access network, its initial downstream wavelength (wavelength channel) can be controlled, so to find a valid downstream signal the receiver must hop over a set of well-defined reference points. The term "weak" here implies that while the ONU may be acceptable for operation within a network without significant impact on the quality of operation, it is still desirable to improve the calibration to further optimize the performance of the ONU.

If an ONU with a receiver having weak calibration properties is installed in a TWDM-PON-based access network, on its initial activation it may not be possible to control which downstream wavelength it is listening to. Therefore, the ONU may scan the receiver tuning range to in search of the valid downstream transmission signal. Applicant's previous patent document PCT/CN2013/071891, filed on Feb. 26, 2013 discloses how to find the valid downstream transmission channel and valid activation channel considering the operational allocation of the bi-directional wavelength channels and the ONU's supported protocol as well as supported downstream and upstream line rate.

The present document provides, among others, techniques to establish and maintain the ONU calibration in a multi-wavelength PON system.

One disclosed method of ONU self-calibration includes the physical layer scanning of the ONU's downstream tuning range. The ONU performs scanning by changing the value of the internal controlled transmitter parameter and recording the values of the parameter that correspond to the peaks of the received optical power. Depending on the calibration properties of the ONU's receiver, the ONU may, at its own discretion, either stop the physical layer scanning after the first found optical power peak and test the downstream signal in the corresponding downstream wavelength channel, or search for the next optical power peak, or to complete scanning of the entire tuning range before testing a downstream signal in the selected downstream wavelength channel. If the ONU chooses not to complete the physical layer scanning of the receiver tuning range, it has sufficient pre-calibration information to extrapolate to the remaining wavelength channels.

Having completed building a preliminary calibration record using the pre-calibration information and the as the results physical layer scan, the ONU acquires a downstream wavelength channel, monitors the transmission wavelength of the channel reporting the critical changes upstream, and continues to adjust its own calibration record using the Channel_Tracking information from the OLT that contains additional information on the best available estimates of the current drift of the effective downstream transmitter wavelengths compared to their nominal standard-based values. The ONU uses the drift estimates to improve the in-service calibration of the ONU receiver, and whenever the ONU is instructed to retune to a different bi-directional wavelength channel, it takes into account the most recent estimate of the target wavelength drift.

To obtain the estimate of the current downstream wavelength drift, each ONU continuously tracks its downstream operational wavelength channel, and whenever the optimal value of the controlled receiver parameter changes sufficiently, reports the change to the OLT. The OLT processes the change reports obtained from the subtending ONUS operating on each downstream wavelength channel and includes an average estimate into the Channel_Map which is periodically broadcast on all wavelength channels.

Figure 1:
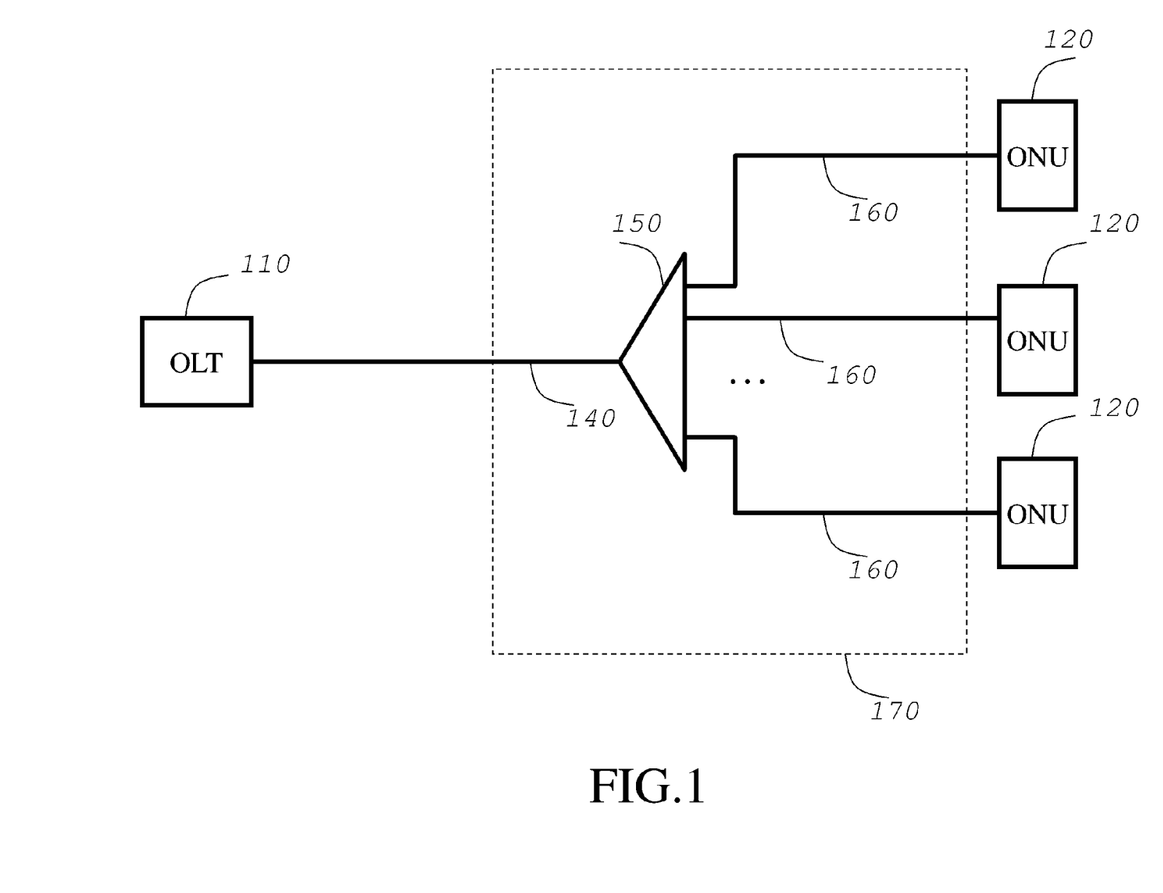
FIG. 1 shows a typical single-channel TDM PON system.

A conventional TDM/TDMA PON system (see FIG. 1) is composed of a single OLT 110 and a plurality of ONUS 120 interconnected by an optical distribution network (ODN) 170 that includes optical feeder fiber or trunk fiber 140, splitter 150, and multiple distribution fibers 160. Such PON systems support a single bi-directional wavelength channel offering unique downstream and unique upstream line rates. All ONUS 120 support fixed downstream and upstream wavelengths and a fixed combination of downstream and upstream line rates. Once an ONU starts activation on the PON, there is a unique OLT it has to interact with, and there is decision to make whether the wavelength channel it supports is appropriate for activation. Prior to transmitting upstream in such a system, an ONU has to learn the parameters of the upstream burst, such as the preamble and delimiter sizes and patterns, that the OLT regularly sends in a downstream broadcast management message.

In a MW-PON system (see FIG. 2), several OLTs 210 each associated with its own wavelength channel are attached to the ODN via the wavelength multiplexor (WM)

Figure 2:
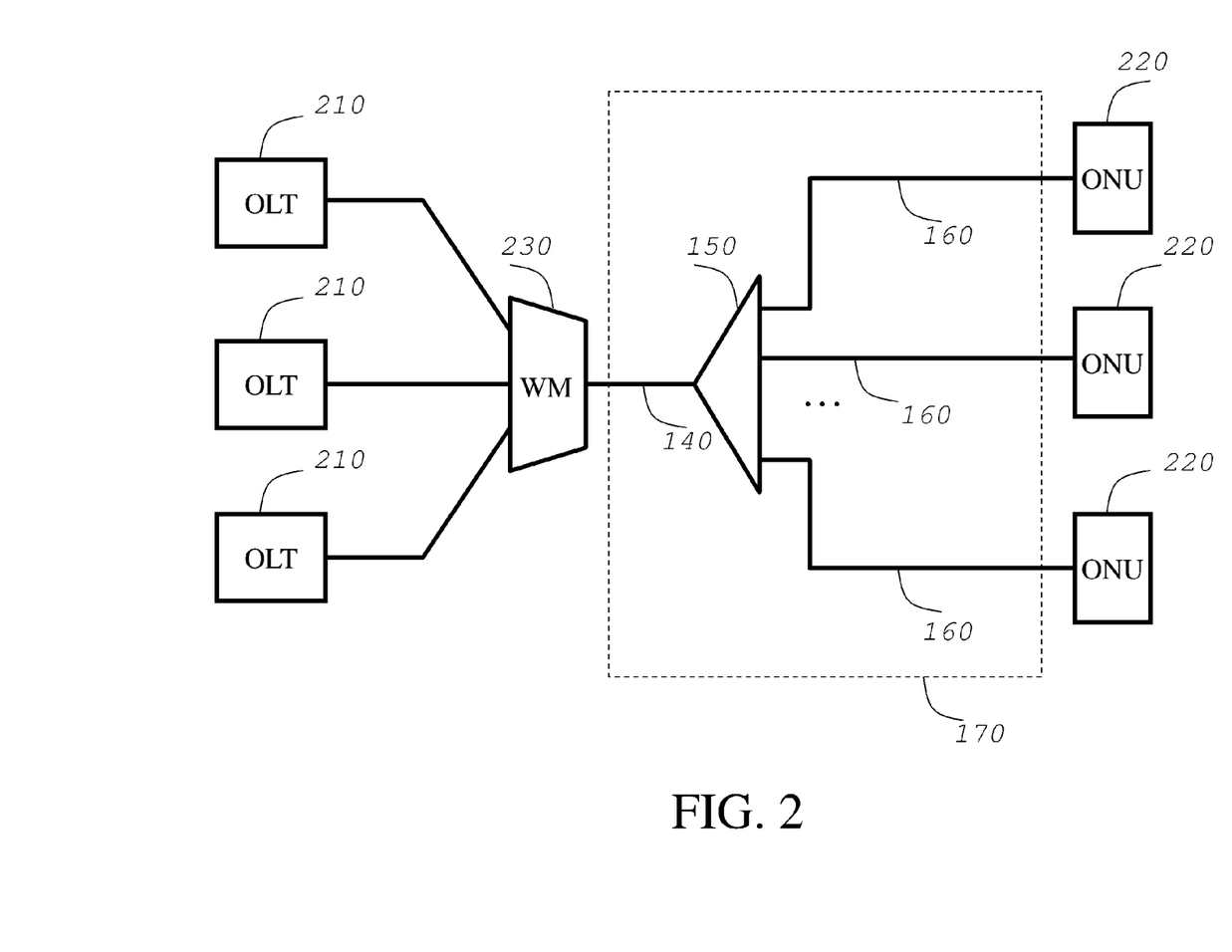
FIG. 2 shows a typical multi-wavelength PON system where multiple OLTs are connected to the conventional ODN via a wavelength multiplexor.

230. Among OLTs that support a common protocol (such as TDM/TWDM), different OLTs may support different downstream and upstream line rates. The MW-PON ONUS 220 could fixed or tunable are connected to the WM 230 and MW-PON OLTs 210 over ODN 170, which remains essentially the same as in the case of conventional TDM PON system.

Figure 3:
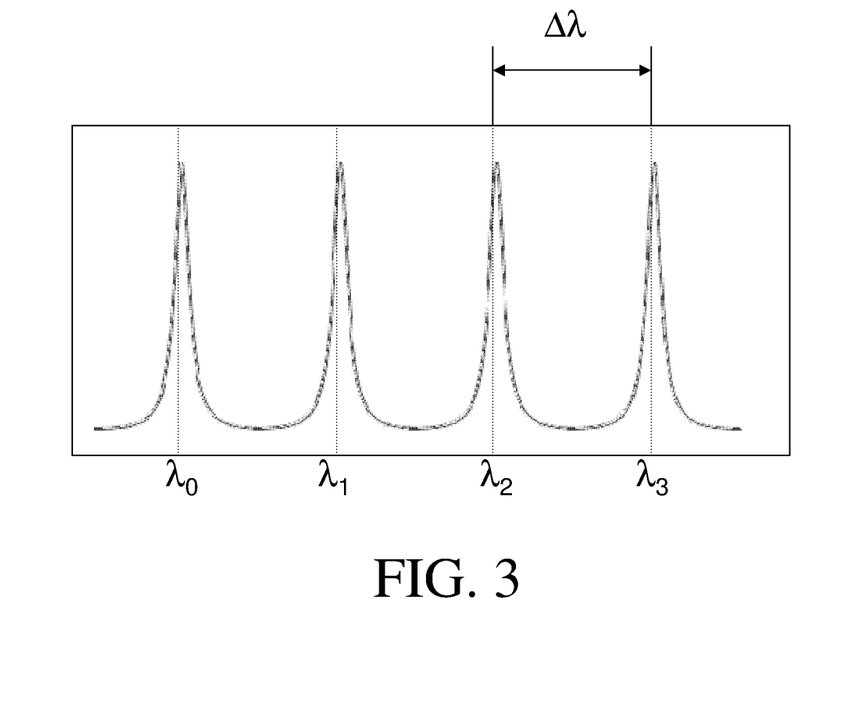
FIG. 3 shows an ideal optical power distribution over the receiver tunable range FIG. 4 provides an example of a practical optical power distribution over the receiver tunable range.

Each OLT in a MW-PON system is associated with a unique bidirectional wavelength channel composed of a single downstream wavelength and one or more of upstream wavelengths. The specific wavelength designation for the use by downstream or upstream channels and the pairing of upstream and downstream channels into bidirectional wavelength channels is determined by the standard or other wide-known industrial convention. In an ideal scenario, as shown in FIG. 3 for the case of 4 wavelength channels, each ONU transmits precisely and consistently at the designated center wavelength of the associated downstream wavelength channel. The center wavelengths $\lambda_0$, $\lambda_1$, $\lambda_2$, and $\lambda_3$ may be equidistant and may be separated by the constant value $\Delta\lambda$. An ONU receiver is considered to be calibrated if for any given wavelength and a plurality uncontrolled environment parameters, it can execute a function to obtain the value of controlled parameter which achieve optical reception on the specified wavelength. In the ideal case represented in FIG. 3, it is sufficient for the calibrated receiver to be able to obtain the values of the controlled parameters to operate on the wavelengths $\lambda_0$, $\lambda_1$, $\lambda_2$, and $\lambda_3$. An uncalibrated receiver may not be able to determine to which wavelength it is presently tuned. In general, ONU receivers may differ in their calibration capabilities and pre-installation (factory) calibration properties.

Figure 4:
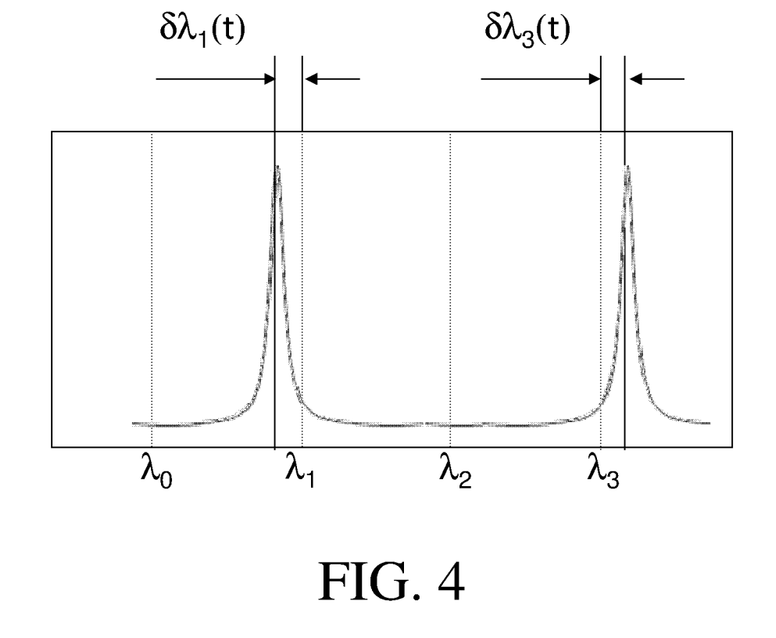

In practice, the optical power distribution over receiver tuning range may be less regular. First, one or more downstream channels may remain inactive with no optical power being transmitted into the fiber form the OLT side. Second, the downstream transmission wavelengths may drift and doffer from the well-known center wavelengths of the corresponding channel. In the example of FIG. 4, only two four known wavelength channels are active (channels 1 and 3), and the transmission wavelengths drift from the respective center wavelengths $\lambda_1$ and $\lambda_2$ by—$\delta\lambda_1$ and $\delta\lambda_3$, respectively.

In some embodiments, an ONU self-calibration procedure (see FIG. 5) is initiated whenever the ONU is activated on the MW-PON system. At 510, the ONU performs a physical layer scan of the tuning range to find the first peak of the received optical power. Once the ONU finds a peak of the optical power, it registers the corresponding values of the controlled and uncontrolled parameters in its calibration record for yet-unknown the first wavelength value. In some embodiments, having found the first peak of the received optical power, the ONU may proceed searching for the second peak of the received optical power. In some embodiments, depending on its pre-calibration information, the ONU may perform extrapolation to obtain the values of controlled parameters for another wavelength value for a given spectral distance between the first and the second wavelength value and the same uncontrolled parameters.

Figure 5:
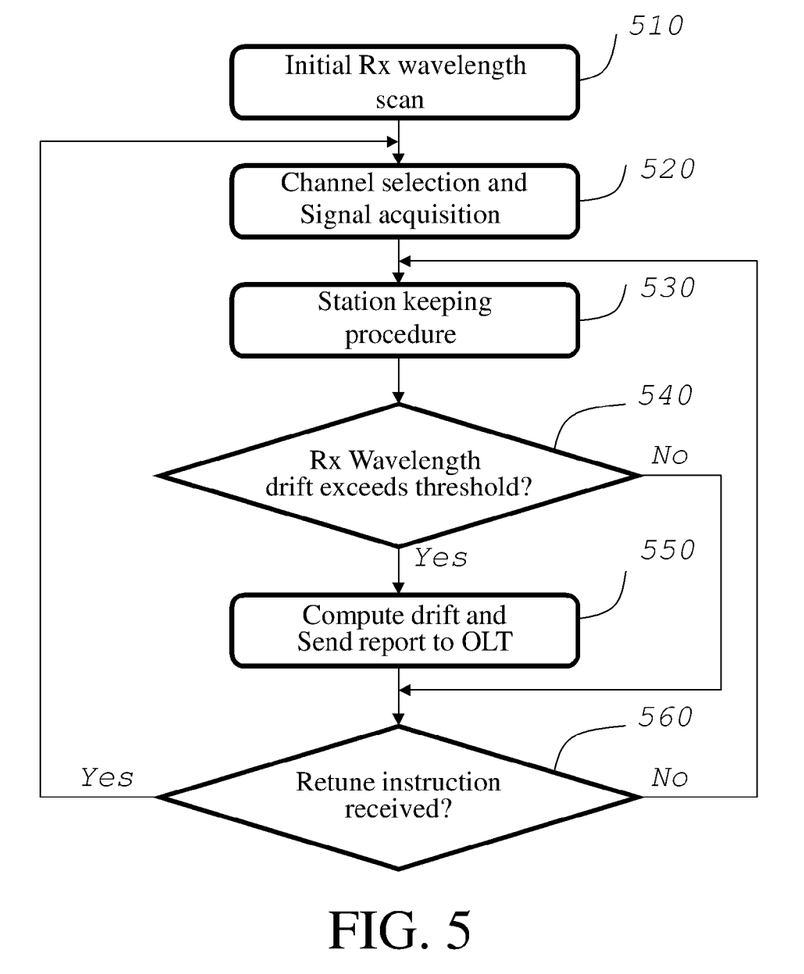
FIG. 5 is the block-diagram of the ONU self-calibration procedure.

Having completed the physical layer scan of the tuning range, the ONU, at 520, selects a peak of received optical power and attempts to initiate an activation procedure on the corresponding wavelength. The core activation procedure is widely known in the art and, in addition, for a MW-PON system may include a step of rate matching, as disclosed in previously cited patent document PCT/CN2013/071891 to ensure that the selected downstream channel and its associated upstream channel support the line rate of the ONU. Consequently, the ONU may have to reselect a peak of received optical power to find an appropriate downstream channel.

At 530, the ONU, in parallel with any other activation and operation steps, may initiate any station-keeping algorithm that allows the ONU to dynamically adjust the controlled tuning parameters to ensure it remains optimally tuned to actual downstream transmitter wavelength.

At 540, the ONU checks whether the change in the controlled tuning parameter exceeds a predefined or configured threshold. If so is the case, the ONU, at 550, computing the equivalent wavelength drift and reporting the value of the drift for the given downstream channel to the OLT. Whether or not the operation 550 is executed as a result of the decision operation 540, the ONU continues tracking the downstream wavelength, executing the station-keeping algorithm 530, unless the receipt of a wavelength tuning instruction at 560 makes the ONU to abandon the old bidirectional wavelength channel and retune to a new channel, in which case the ONU uses its calibration record to obtain the values of controlled parameters for the target channel, and continues the self-calibration procedure from operation 520 performed in the target channel.

The OLT receiving drift reports from the ONUS operating on OLT's associated downstream wavelength channels processes these reports and estimates whether the transmitter wavelength drift has occurred indeed. If so is the case, the OLT includes the updates channel drift value into the broadcast Channel_Tracking information that is broadcast on OLT's associated downstream wavelength channels and on the associated channels of all other active OLTs in the MW-PON system. The Channel_Tracking message contains the estimated channels drift values for all active downstream channels in the MW-PON system.

Upon receipt of the first Channel_Tracking message, the ONU updates the wavelength parameters of the selected peak of the received optical power in its calibration record. On receipt of the first and subsequent Channel_Tracking message, the ONU also updates the wavelength values corresponding to other downstream channels in its calibration record and dynamically adjusts the corresponding values of the controlled tuning parameters.

Figure 6:
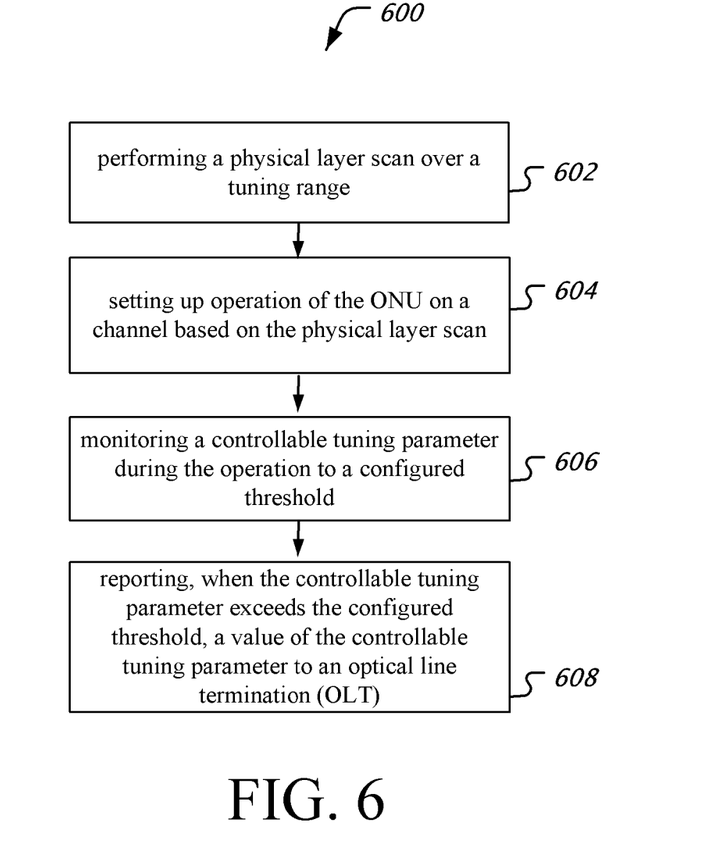
FIG. 6 is a flowchart representation of an optical communications process.

FIG. 6 is a flowchart representation of a process 600 of optical communications.

At 602, the process 600 performs a physical layer scan over a tuning range;

At 604, the process 600 sets up operation of the ONU on a channel based on the physical layer scan;

At 606, the process 600 monitors a controllable tuning parameter during the operation to a configured threshold.

At 608, the process 600 reports, when the controllable tuning parameter exceeds the configured threshold, a value of the controllable tuning parameter to an optical line termination (OLT).

Figure 7:
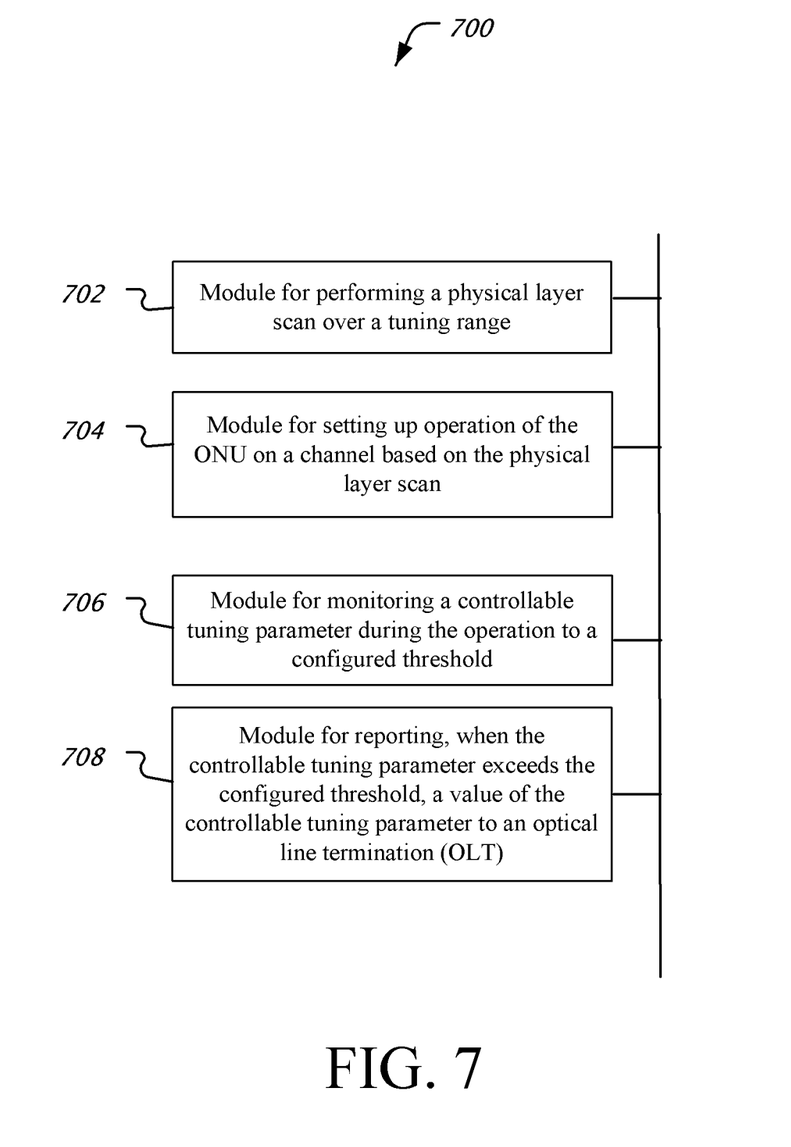
FIG. 7 is a block diagram representation of an Optical Network Unit.

FIG. 7 is a block diagram representation of an optical communication apparatus 700. The module 702 is for performing a physical layer scan over a tuning range. The module 704 is for setting up operation of the ONU on a channel based on the physical layer scan The module 706 is for monitoring a controllable tuning parameter during the operation to a configured threshold. The module 708 is for reporting, when the controllable tuning parameter exceeds the configured threshold, a value of the controllable tuning parameter to an optical line termination (OLT). The apparatus 700 and modules 702, 704, 706, 708 may further be configured to implement some techniques disclosed herein.

Figure 8:
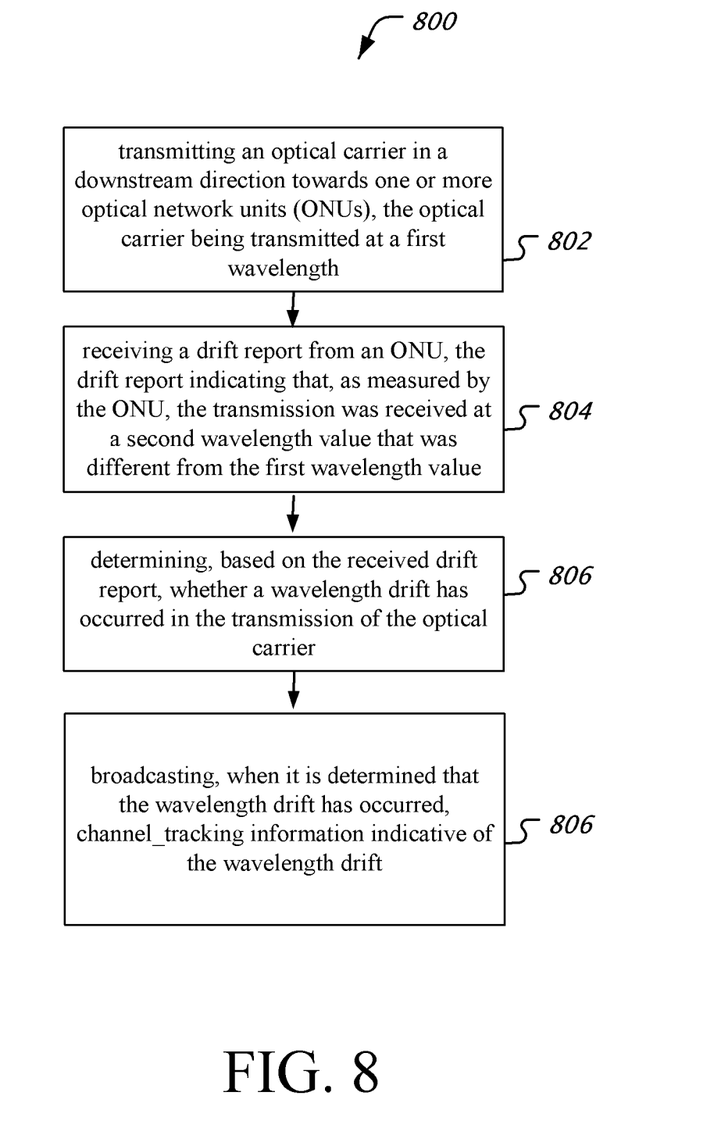
FIG. 8 is a flowchart representation of an optical communications process.

FIG. 8 is a flow chart representation of a process 800 of optical communications.

At 802, the process 802 transmits an optical carrier in a downstream direction towards one or more optical network units (ONUs), the optical carrier being transmitted at a first wavelength;

At 804, the process 800 receives a drift report from an ONU, the drift report indicating that, as measured by the ONU, the transmission was received at a second wavelength value that was different from the first wavelength value.

At 806, the process 800 determines, based on the received drift report, whether a wavelength drift has occurred in the transmission of the optical carrier;

At 808, the process 800 broadcasts when it is determined that the wavelength drift has occurred, channel_tracking information indicative of the wavelength drift.

Figure 9:
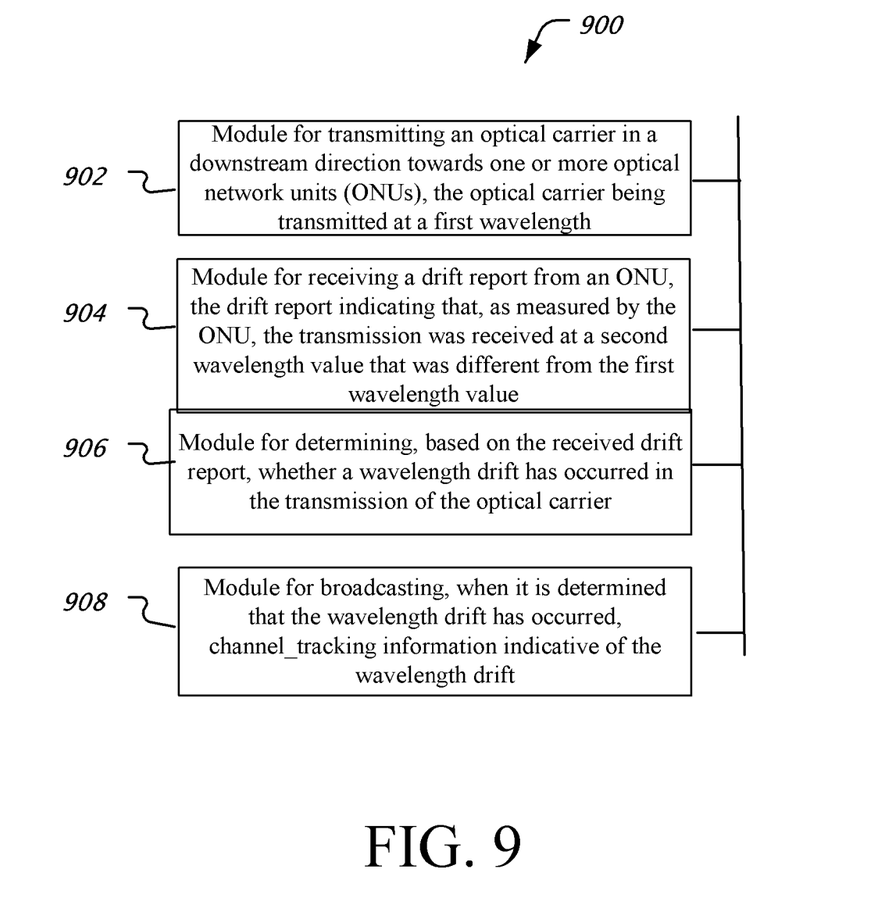
FIG. 9 is a block diagram representation of an Optical Line Terminal.

FIG. 9 is a block diagram representation of an optical line termination apparatus 900. The module 902 is for transmitting an optical carrier in a downstream direction towards one or more optical network units (ONUs), the optical carrier being transmitted at a first wavelength. The module 904 is for receiving a drift report from an ONU, the drift report indicating that, as measured by the ONU, the transmission was received at a second wavelength value that was different from the first wavelength value. The module 906 is for determining, based on the received drift report, whether a wavelength drift has occurred in the transmission of the optical carrier. The module 908 is for broadcasting, when it is determined that the wavelength drift has occurred, channel_tracking information indicative of the wavelength drift. The apparatus 900 and modules 902, 904, 906, 908 may further be configured to implement some techniques disclosed herein.

It will be appreciated that techniques for self-calibration of an optical network unit are disclosed. In some embodiments, drifts in the received carrier wavelength are monitored and reconciled with a channel information message reported from the network side.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of operating an optical network unit (ONU) in an optical communication network, comprising:
performing a physical layer scan over a tuning range;
setting up operation of the ONU on a channel based on the physical layer scan;
monitoring a controllable tuning parameter during the operation to a configured threshold;
reporting, when the controllable tuning parameter exceeds the configured threshold, a value of the controllable tuning parameter to an optical line termination (OLT);
receiving a channel_tracking message that includes drift value information from the OLT, the drift value information having been generated based on a previous report from the ONU to the OLT; and
adjusting the configured threshold based on the received channel_tracking message.

2. The method of claim 1, wherein
the optical communication network includes additional OLTs,
the tuning range is a downstream tuning range, and
the performing of the physical scan includes finding a peak of a received optical power from at least one of the OLTs, wherein each OLT transmits on a unique downstream wavelength.

3. The method of claim 1, wherein the monitoring of the controllable tuning parameter includes computing a wavelength drift.

4. The method of claim 1, wherein the setting up operation of the ONU includes initiating a station-keeping algorithm that allows the ONU to dynamically adjust the controllable tuning parameters to enable the ONU to be optimally tuned to a downstream transmitter wavelength.

5. An optical network unit (ONU) apparatus for operation in an optical communication network, comprising:
a receiver configured to perform a physical layer scan over a tuning range;
a processor configured to implement a method comprising:
setting up operation of the ONU on a channel based on the physical layer scan;
monitoring a controllable tuning parameter during the operation to a configured threshold;
reporting, when the controllable tuning parameter exceeds the configured threshold, a value of the controllable tuning parameter to an optical line termination (OLT);
receiving a channel_tracking message that includes drift value information from the OLT, the drift value information having been generated based on a previous report from the ONU to the OLT; and
adjusting the configured threshold based on the received channel_tracking message.

6. The optical network unit (ONU) apparatus of claim 5, wherein
the optical communication network includes additional OLTs,
the tuning range is a downstream tuning range, and
the transmitter is further configured to find a peak of a received optical power from at least one of the OLTs, wherein each OLT transmits on a unique downstream wavelength.

7. The optical network unit (ONU) apparatus of claim 5, wherein the monitoring of the controllable tuning parameter includes computing a wavelength drift.

8. The optical network unit (ONU) apparatus of claim 5, wherein the setting up operation of the ONU includes initiating a station-keeping algorithm that allows the ONU to dynamically adjust the controllable tuning parameters to enable the ONU to be optimally tuned to a downstream transmitter wavelength.

9. An optical network unit (ONU) for operation in an optical communication network, comprising a memory and a processor;
wherein the memory stores instruction code that, when executed by the processor, causes the processor to implement a method, comprising:
performing a physical layer scan over a tuning range;
setting up operation of the ONU on a channel based on the physical layer scan;
monitoring a controllable tuning parameter during the operation to a configured threshold;
reporting, when the controllable tuning parameter exceeds the configured threshold, a value of the controllable tuning parameter to an optical line termination (OLT);
receiving a channel_tracking message that includes drift value information from the OLT, the drift value information having been generated based on a previous report from the ONU to the OLT; and
adjusting the configured threshold based on the received channel_tracking message.

10. The ONU of claim 9, wherein
the optical communication network includes additional OLTs,
the tuning range is a downstream tuning range, and
the performing of the physical scan includes finding a peak of a received optical power from at least one of the OLTs, wherein each OLT transmits on a unique downstream wavelength.

11. The ONU of claim 9, wherein the monitoring of the controllable tuning parameter includes computing a wavelength drift.

12. The ONU of claim 9, wherein the setting up operation of the ONU includes initiating a station-keeping algorithm that allows the ONU to dynamically adjust the controllable tuning parameters to enable the ONU to be optimally tuned to a downstream transmitter wavelength.

13. A method of operating an optical line termination (OLT) apparatus in an optical communication network, comprising:
transmitting an optical carrier in a downstream direction towards one or more optical network units (ONUs), the optical carrier being transmitted at a first wavelength;
receiving a drift report from an ONU, the drift report indicating that, as measured by the ONU, the transmission was received at a second wavelength value that was different from the first wavelength value;
determining, based on the received drift report, whether a wavelength drift has occurred in the transmission of the optical carrier; and
broadcasting, when it is determined that the wavelength drift has occurred, channel_tracking information indicative of the wavelength drift.

14. The method of claim 13, wherein the channel_tracking comprises wavelength drift information for each downstream channel being used in the optical communication network.

15. An apparatus for operating an optical line termination (OLT) apparatus in an optical communication network, comprising:
- a transmitter configured to transmit an optical carrier in a downstream direction towards one or more optical network units (ONUs), the optical carrier being transmitted at a first wavelength;
- a processor configured to implement a method comprising:
    - receiving a drift report from an ONU, the drift report indicating that, as measured by the ONU, the transmission was received at a second wavelength value that was different from the first wavelength value;
    - determining, based on the received drift report, whether a wavelength drift has occurred in the transmission of the optical carrier; and
    - broadcasting, when it is determined that the wavelength drift has occurred, channel_tracking information indicative of the wavelength drift.

16. The apparatus of claim 15, wherein the channel_tracking comprises wavelength drift information for each downstream channel being used in the optical communication network.

17. A non-transitory computer-readable program medium having code stored thereupon, the code comprising instructions causing a processor to implement a method of operating an optical network unit (ONU) in an optical communication network, comprising:
- instructions for performing a physical layer scan over a tuning range;
- instructions for setting up operation of the ONU on a channel based on the physical layer scan;
- instructions for monitoring a controllable tuning parameter during the operation to a configured threshold;
- instructions for reporting, when the controllable tuning parameter exceeds the configured threshold, a value of the controllable tuning parameter to an optical line termination (OLT);
- instructions for receiving a channel_tracking message that includes drift value information from the OLT, the drift value information having been generated based on a previous report from the ONU to the OLT; and
- instructions for adjusting the configured threshold based on the received channel_tracking message.

18. A non-transitory computer-readable program medium having code stored thereupon, the code comprising instructions causing a processor to implement a method of operating an optical line termination (OLT) apparatus in an optical communication network, comprising:
- instructions for transmitting an optical carrier in a downstream direction towards one or more optical network units (ONUs), the optical carrier being transmitted at a first wavelength;
- instructions for receiving a drift report from an ONU, the drift report indicating that, as measured by the ONU, the transmission was received at a second wavelength value that was different from the first wavelength value;
- instructions for determining, based on the received drift report, whether a wavelength drift has occurred in the transmission of the optical carrier; and
- instructions for broadcasting, when it is determined that the wavelength drift has occurred, channel_tracking information indicative of the wavelength drift.

19. The non-transitory computer-readable program medium of claim 18, wherein the channel_tracking comprises wavelength drift information for each downstream channel being used in the optical communication network.

* * * * *